United States Patent
Cendrillon

(10) Patent No.: US 7,835,429 B1
(45) Date of Patent: Nov. 16, 2010

(54) TRANSMIT SPECTRUM FOR A DIGITAL SUBSCRIBER LINE SIGNAL

(75) Inventor: Raphael Jean Cendrillon, Kennedy Town (HK)

(73) Assignee: Marvell International Ltd. (BM)

(*) Notice: Subject to any disclaimer, the term of this patent is extended or adjusted under 35 U.S.C. 154(b) by 849 days.

(21) Appl. No.: 11/788,250

(22) Filed: Apr. 18, 2007

Related U.S. Application Data

(60) Provisional application No. 60/796,920, filed on May 2, 2006, provisional application No. 60/802,359, filed on May 22, 2006.

(51) Int. Cl.
*H04B 1/38* (2006.01)
*H04L 5/16* (2006.01)

(52) U.S. Cl. .................. 375/222; 375/225; 370/201

(58) Field of Classification Search .............. 375/219, 375/222–225, 227, 257, 285, 287–288, 296; 370/201
See application file for complete search history.

(56) References Cited

U.S. PATENT DOCUMENTS

| | | | | |
|---|---|---|---|---|
| 5,524,122 | A * | 6/1996 | Lepitre et al. ............... | 375/222 |
| 6,738,418 | B1 * | 5/2004 | Stiscia et al. ................ | 375/222 |
| 6,980,601 | B2 * | 12/2005 | Jones .......................... | 375/261 |
| 7,154,957 | B1 * | 12/2006 | Monk et al. ................. | 375/261 |
| 7,165,209 | B2 * | 1/2007 | LaBerge ...................... | 714/790 |
| 7,274,734 | B2 * | 9/2007 | Tsatsanis .................... | 375/222 |
| 7,406,117 | B2 * | 7/2008 | Bella et al. .................. | 375/219 |
| 7,606,350 | B2 * | 10/2009 | Cioffi et al. ................. | 379/1.03 |
| 7,664,522 | B2 * | 2/2010 | Stolle et al. ................. | 455/522 |
| 2003/0099286 | A1 * | 5/2003 | Graziano et al. ............ | 375/222 |
| 2004/0086064 | A1 | 5/2004 | Van Acker et al. | |
| 2004/0264559 | A1 | 12/2004 | Cendrillon et al. | |
| 2006/0098670 | A1 * | 5/2006 | Voit et al. ................... | 370/401 |
| 2008/0095188 | A1 * | 4/2008 | Remy et al. ................. | 370/468 |

FOREIGN PATENT DOCUMENTS

| | | |
|---|---|---|
| CN | 1578186 A | 2/2005 |
| EP | 1 414 164 A1 | 4/2004 |
| EP | 1 492 261 A1 | 12/2004 |

OTHER PUBLICATIONS

A. Fasano, "On the Optimal Discrete Bit Loading for Multicarrier Systems with Constraints," *Proc. Vehicular Technology Conference (VTC)*, pp. 915-919, vol. 2, 2003.

K. Jacobsen, "Methods of Upstream Power Backoff on Very High-Speed Digital Subscriber Lines," *IEEE Commun. Mag.*, pp. 210-216, Mar. 2001.

(Continued)

*Primary Examiner*—Jean B Corrielus
(74) *Attorney, Agent, or Firm*—Brinks, Hofer, Gilson & Lione

(57) ABSTRACT

A technique to shape the transmit spectrum for a digital subscriber line modem includes utilizing information indicative of crosstalk into the line of another modem. The transmit spectrum is divided by an adjustable transition frequency into a lower frequency region and a mask region. Crosstalk information about the line of the other modem is obtained and the transition frequency and the low frequency region power spectral density are adjusted to account for the data rates of both modems.

72 Claims, 8 Drawing Sheets

OTHER PUBLICATIONS

American National Standard for Telecommunications, "Interface Between Networks and Customer Installation Very-high-bit-rate Digital Subscriber Lines (VDSL) Metallic Interface (DMT based)", *Alliance for Telecommunications Industry Solutions* publication, Jun. 2004, 175 pages.

Cendrillon, R. et al., "Iterative Spectrum Balancing for Digital Subscriber Lines", in *IEEE Intl. Commun. Conference (ICC)*, May 2005.

Cendrillon, R. et al., "Optimal Multi-user Spectrum Management for Digital Subscriber Lines", *in Proc. IEEE Int. Conf. on Comm. (ICC)*, Jun. 2004.

Cendrillon, R. et al., "Optimal Multiuser Spectrum Balancing for Digital Subscriber Lines", *in IEEE Trans. on Commun.*, pp. 922-933, May 2006.

Huang, J. et al. "Autonomous Spectrum Balancing (ABS) for Frequency Selective Interface Channels," submitted to *IEEE Intl. Symposium Information Theory (ISIT)*, 2006.

Yu, W. et al., "Distributed Multiuser Power Control for Digital Subscriber Lines," *IEEE Journal Selected Areas in Commun.*, pp. 1105-1115, Jun. 2002.

\* cited by examiner

TRANSMIT SPECTRUM FOR A DIGITAL SUBSCRIBER LINE SIGNAL

CROSS REFERENCE TO RELATED APPLICATION

This application claims the benefit of U.S. Provisional Application No. 60/796,920, filed May 2, 2006, and U.S. Provisional Application No. 60/802,359, filed May 22, 2006, which are hereby incorporated by reference.

TECHNICAL FIELD

The present disclosure relates to data transfer rates in digital subscriber line systems. Specifically, the disclosure relates to using crosstalk information to shape a modem's transmit spectrum.

BACKGROUND

Digital subscriber line (DSL) technology provides for digital data transmission over the twisted pair wires of a local telephone network. A DSL network utilizes the available frequency spectrum on the twisted pair wires to carry digital signals between a customer's DSL modem and a central office (the "local loop"). Each DSL modem transmits within an assigned frequency band having a number of channels. Each channel is characterized by its power spectral density (PSD) and its transfer bit-rate.

In the local loop, groups of twisted pair wires are brought together and housed in a protective jacket or sheath, referred to as a binder. Because several wires are brought in close proximity to one another within the binder, capacitive coupling between channels from different modem bands results in the leakage of signal power from one channel into another, causing one signal to affect another signal. The result is "crosstalk" and it is generally, but not always, worse between adjacent pairs in the sheath.

A modem's transmit spectrum includes the power spectral density (PSD) for each channel in the band. Among other factors, the transmit spectrum determines the distribution of crosstalk from the modem's line into the lines of other modems. Consequently, the shape of a modem's transmit spectrum determines the rate of successful data transfer for the transmitting modem and (potentially) causes crosstalk into the channels of other modem(s), thereby lowering the rate of successful data transfer of the other modem(s). Modems are programmed to respond to crosstalk by swapping bit-rates between channels. However, it is not uncommon to have crosstalk interference on a majority of a modem's channels, making it improbable that the modem is going to achieve its target data rate.

Transmit spectrum management includes identifying or predicting the channels within a binder that are (or will be) affected by a modem's signal. Three considerations of transmit spectrum management are (1) a DSL binder has many lines, and consequently many channels (e.g., 40,000), (2) only a relatively small number of those lines (and channels) are in "crosstalk proximity" to one another, and (3) line attributes such as length and gauge factor into a line's susceptibility to crosstalk interference. Transmit spectrum management techniques may also consider line attenuation, which causes a decrease in the PSD of the line's channels. Longer lines are especially susceptible to data-rate transfer drop-off due to crosstalk. Goals of transmit spectrum management include establishing a transmit spectrum for a modem band such that the transmitting modem achieves its target data-rate while minimizing crosstalk into susceptible and higher bit-rate channels of other modem bands.

An existing approach for reducing crosstalk interference includes reducing the transmission power for the signal(s) that are causing crosstalk, and increasing the transmission power for the signal(s) that have low data transfer rates until all lines have the same received data rate. However, this approach does not provide for achieving a desired data rate on a line while minimizing crosstalk into a channel on a second line.

SUMMARY

In order to address the deficiencies identified above, a technique to shape a modem's transmit spectrum that factors both the target data transfer rate for the modem and the effects of crosstalk into other lines in the binder is disclosed. According to a first aspect of the invention, the transmit spectrum for a modem in a DSL network is adjusted while changes are observed in the data rate of the modem and a crosstalk line. The initial transmit spectrum has a first transition frequency and a first low frequency power spectral density. The low frequency power spectral density is incrementally adjusted through a low frequency power spectral density range. The transition frequency is incrementally adjusted through a transition frequency range. The transition frequency and the low frequency power spectral density of the transmit spectrum are set based upon the changes observed in the data rate of the modem and crosstalk line as the adjustments were made, and to provide acceptable data transfer rates for both the modem and the crosstalk line (modem).

According to a second aspect, first crosstalk line data rate information is received while a modem transmits at a first transition frequency and a first low frequency power spectral density. Second crosstalk line data rate information is received while the modem transmits at a second transition frequency, different from the first transition frequency, and a second low frequency power spectral density, different from the first low frequency power spectral density. The transmit spectrum is shaped based upon the first crosstalk line data rate information and the second crosstalk line data rate information.

According to another aspect, first data is provided indicating a first rate of data transfer within a crosstalk line while a modem transmits at a first transition frequency and a first low frequency power spectral density. Second data is provided indicating a second rate of data transfer within the crosstalk line while the modem transmits at a second transition frequency, different from the first transition frequency, and at a second low frequency power spectral density, different from the first low frequency power spectral density. The data may be provided to a processor in the central office and/or the modem.

According to yet another aspect, the crosstalk line is selected from a plurality of network lines based upon a first set of data transfer rate information obtained while a modem is deactivated (and other modems in the line are active), and a second set of data transfer rate information obtained while the modem is activated.

According to an additional aspect, the crosstalk line is selected based upon the characteristics of the signals and/or lines in the binder, including signal attenuation (weak signal), line length, location in the binder with respect to other lines, bit-rate, data-rate, and/or level of service (basic, premium, etc.) provided on the line.

Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
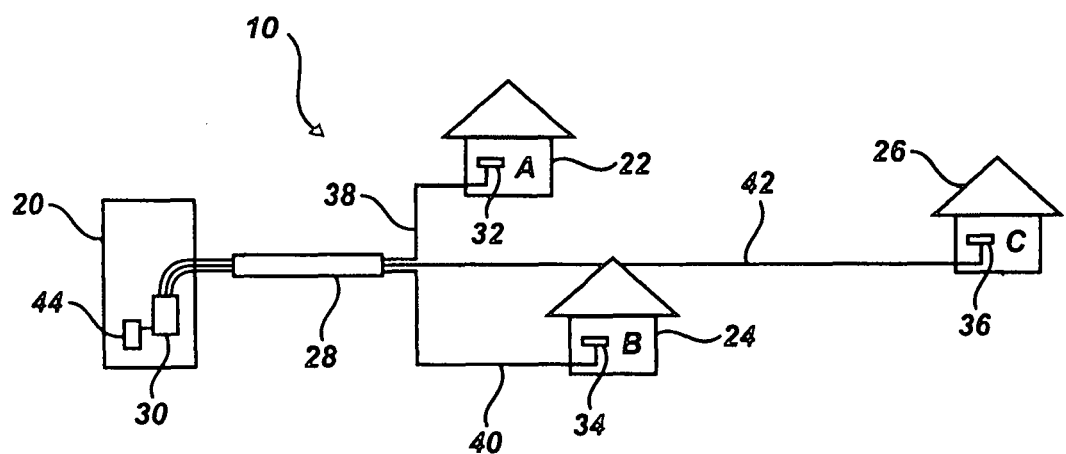
FIG. 1 is an illustration of the prior art showing a central office in communication with several DSL modems at different locations.

FIG. 1 (prior art) models a DSL network 10 having a central office 20 in communication with three modems (or, more generally, interface devices) 32, 34, and 36. Each modem is located within a residence 22, 24, and 26 served by the central office 20. For clarity of explanation, it may be assumed that the distances between the central office 20 and residences 22, 24, and 26 are three-hundred, six-hundred, and nine-hundred meters, respectively. Each modem 32, 34, and 36 communicates with the central office 20 via a twisted pair wire 38, 40, and 42, respectively, having a length that corresponds to the distance between the central office 20 and each residence 22, 24, and 26. The wires have been brought together and housed within a binder 28 and connected to a digital subscriber line access multiplexer (DSLAM) 30 in communication with a processor 44. The DSLAM 30 and/or processor 44 may comprise an interface device.

Figure 2:
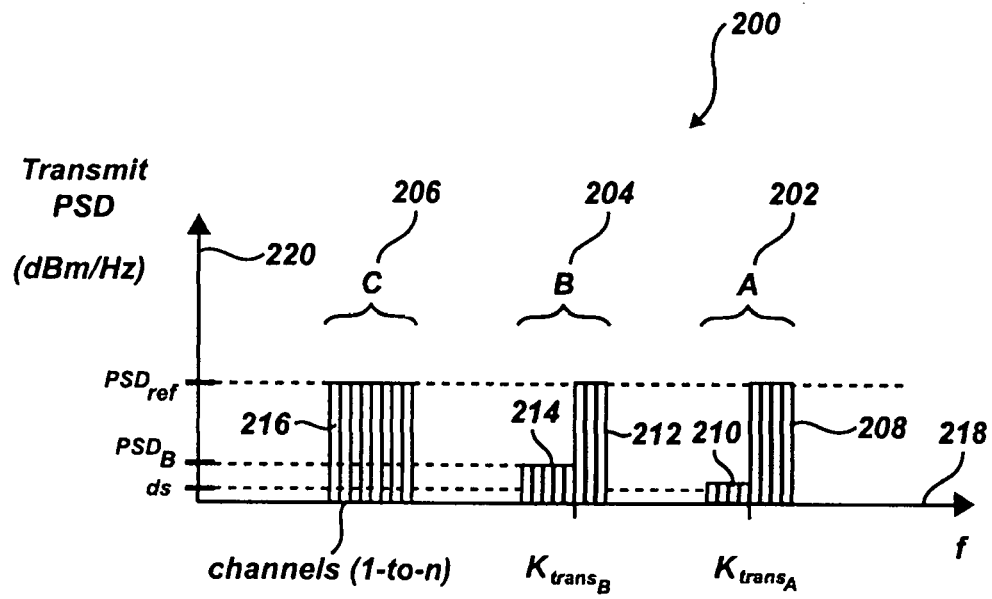
FIG. 2 is a graph showing the transmit spectrums of three modems according to a disclosed technique for adjusting the power spectral density of channels in a modem band.

FIG. 2 is a transmit spectrum graph 200 of transmit PSD 220 as a function of frequency 218 for the channels of the three modems 32, 34, and 36 of FIG. 1. In this graph, modem 32 has a transmit spectrum 202, modem 34 has a transmit spectrum 204, and modem 36 has a transmit spectrum 206. Each transmit spectrum 202, 204, and 206 has n channels or "tones". For clarity of explanation, it may be assumed that modems 34 and 36 are presently online. Each channel of modem 36 has a transmit $PSD_{ref}$ which is the maximum power spectral density for modem 36, also referred to as the spectral mask of modem 36. The channels of modem 34 are divided into two regions: a low frequency region 214 in which all channels transmit at a power spectral density $PSD_B$ below the maximum power spectral density $PSD_{ref}$ (and spectral mask) of modem 36, and a spectral mask frequency region 212 in which all channels transmit at the maximum power spectral density $PSD_{ref}$. According to the disclosure, the transmit spectrum for modem 32 is adjusted to provide a target data transfer rate for modem 32 and to account for crosstalk into the channels of modem 36, which has the presently designated "weakest" line in the bundle due to, in this example, its length.

Figure 3:
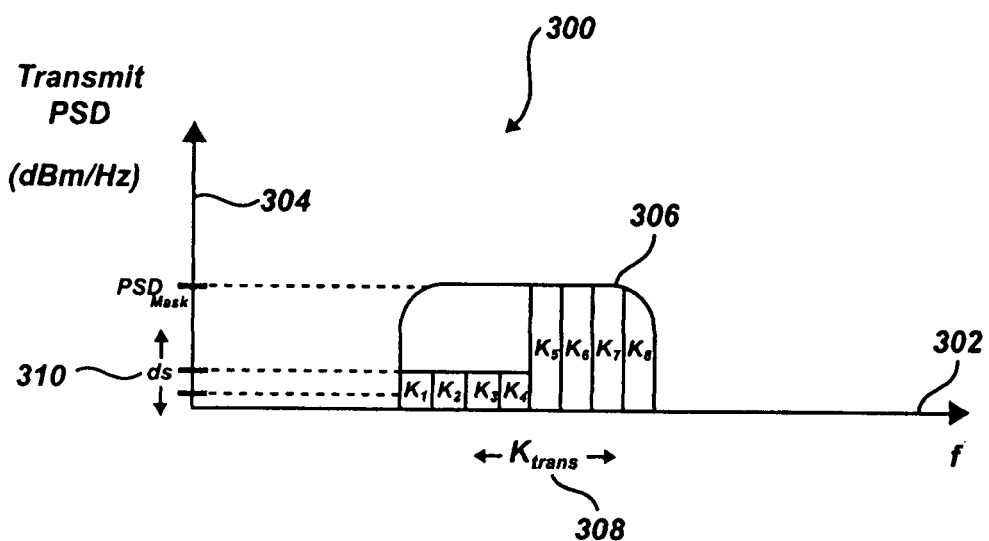
FIG. 3 is a graph showing details of a disclosed technique for adjusting the lower frequency transmit power spectral density and the transition frequency for a modem.

FIG. 3 is a transmit spectrum graph 300 of transmit PSD 304 as a function of frequency 302, showing the spectral mask 306 of modem 32, which has a maximum power spectral density $PSD_{Mask}$. The channels of modem 32 are divided into two regions by an adjustable frequency $K_{trans}$ 308. The transmit spectrum of modem 32 has low frequency (below $K_{trans}$ 308) channels $K_1$, $K_2$, $K_3$, and $K_4$, each having a variable power spectral density ds 310, and high frequency (above $K_{trans}$ 308) channels $K_5$, $K_6$, $K_7$, and $K_8$, each transmitting at the maximum power spectral density $PSD_{Mask}$ for spectral mask 306.

Figure 4:
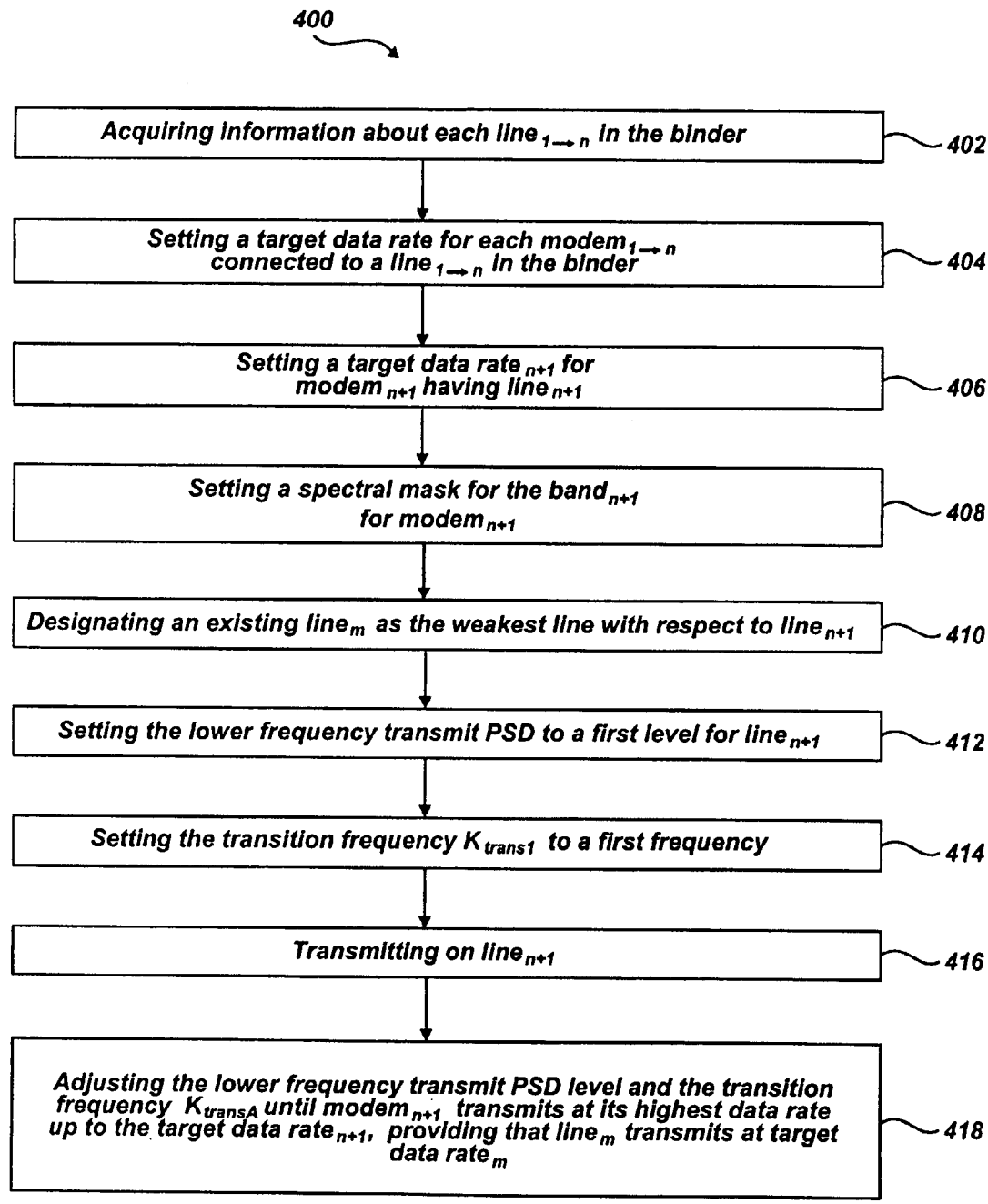
FIG. 4 is a flowchart showing the steps of a disclosed technique for adjusting the lower frequency transmit power spectral density and the transition frequency for a modem.

FIG. 4 shows steps 400 for shaping the transmit spectrum for modem 32. The steps 400 may be performed by a processor within customer premises equipment, such as within the modem 32. In another version, the steps 400 are performed by a processor embedded in equipment in the central office 20. In still another version, the steps 400 are performed by an add-on processor to the modem 32 or to equipment in the central office 20.

The steps 400 may be performed when modem 32 is first powered-up for communication in a DSL network. In an alternate version, the steps 400 may be performed to update the shape of the transmit spectrum, such as when a new crosstalk line is identified. In still another version, the steps 400 may be performed at any appropriate time, such as upon receiving a command initiated by an operator at the central office or by a residential or commercial customer.

At 402, information is acquired about each line in the binder for identifying a crosstalk line. An autonomous version for identifying a crosstalk line estimates crosstalk as accurately as possible without actually detecting crosstalk amongst the lines in the binder. The autonomous version estimates crosstalk based upon information such as the lengths and locations of the lines in the binder with respect to other lines. Other information that may be used to identify a crosstalk line includes the current bit-rates of each channel in the line and the target data transfer rate of the modems. The information may be acquired by the central office 20, the modems 32, 34, and 36 (each of which may have or may connect to a processor (not shown) for performing at least one of the steps of FIG. 4), or may be communicated from a processor 44 to the central office 20 and/or to the modems 32, 34, and 36.

A centralized version for identifying a crosstalk line is based upon detecting actual changes in the bit rates of channels of lines in the binder as modems are activated. When a modem is first activated, bit rate reduction indicates the introduction of crosstalk. The centralized version is discussed in more detail below.

At 404 target data rates are set for each modem. The target data rates may be set according to customer needs or demands, the type of business or residence served, or may be "basic" or "premium" service data rates. For example, the "basic" service data rate may be 3 Mbps and the "premium" service data rate may be 6 Mbps. The target data rates may be set utilizing the information acquired at step 402. The target data rates may be retrieved from the central office 20, the processor 44, a medium readable by the processor 44, a modem, or other source.

At 406 a target data rate is set for the modem 32 preparing to go online. The target data rate may be set according to customer needs or demands, the type of business or residence served, or according to a service category. Information acquired at step 402 may also be referenced when setting the target data rate. The target data rate may be designated by an operator in communication with the central office 20 or the modem 32.

At 408 a spectral mask (FIG. 3, 306) is set for the modem band. The spectral mask 306 may be set according to design objectives, or to a standard such as xDSL. For example, xDSL standards set spectral masks according to frequency: at the lower frequencies (up to 1.1 MHz) the spectral mask is set to −40 dBm/Hz; at the higher frequencies the spectral mask is set to −60 dBm/Hz.

At 410 a line in the system is designated as the weakest $line_m$ 42 with respect to the modem 32 preparing to go online. The central office 20, a processor 44, the modem 32, or other device may have designated a $line_m$ 42 as weakest based upon information that may include length. Weak lines may also be designated based upon their location in the binder. In one version, the weakest line is designated based upon a technique (discussed below) for identifying crosstalk channels. The weakest $line_m$ 42 may be an actual line, a theoretical line, a line derived as the weighted sum of the rates of all the lines in the binder, or a line derived by the central office 20, processor 44, modem 32, or other device. The weakest $line_m$ 42 may be designated by an operator or retrieved from a memory device. The weakest $line_m$ 42 may be a line having a protected status for reasons not directly related to susceptibility, length, or strength. A line may be designated as weakest for the purpose of preserving a target data transfer rate or a bit-rate on a channel.

At 412 a variable low frequency region transmit PSD ds 310 is set to a first value. In one implementation, ds 310 is initially set to $PSD_{mask}$. In another implementation, ds 310 is initially set at 0 dBm/Hz. The value of ds may be set by the central office 20, a processor 44, modem 32, other device, or operator in communication with the central office 20.

At 414 a transition frequency $K_{transA}$ is set to a first frequency $K_{trans1}$. In the present implementation, $K_{trans1}$ is set at 30 MHz, which is the maximum frequency used in DSL systems. The transition frequency $K_{trans1}$ may be set by the central office 20, a processor 44, modem 32, other device, or operator in communication with the central office 20.

At 416, modem 32 transmits data to the central office 20 within a transmit spectrum having a low frequency (below $K_{trans1}$) PSD of ds and a higher frequency PSD of $PSD_{mask}$.

At 418 the online modem 32 monitors its data transfer rate and the data transfer rate of the weakest line as it adjusts ds and $K_{transA}$. In one implementation, $K_{transA}$ is decremented in intervals of 1 channel ($K_Z \ldots K_8, K_7, K_6 \ldots K_1$) and the data rates of modem 32 and modem 36 are determined at each interval. At $K_1$, ds is decremented one level and $K_{transA}$ is reset to $K_{trans1}$. The data rates of modem 32 and modem 36 are again determined as $K_{transA}$ is decremented. In one implementation, ds is decremented in steps of 0.1 dB from 0 to −90 dBm/Hz. In another implementation, the step size is set according to the accuracy supported by the modem. The data transfer rate of the weakest $line_m$ 42 may be monitored by checking the bit-rates of the channels in the weakest $line_m$ 42 as each adjustment is made. In another version, the data transfer rate of the weakest $line_m$ 42 may be monitored by the central office 20 and communicated to the online modem 32.

The transmit spectrum for modem 32 is set according to the data rates achieved at the various combinations of $K_{trans}$ and ds so that both the transmitting modem 32 and the modem 36 connected to the weakest $line_m$ 42 transfer data at their respective target rates.

Note that it is possible that no transmit spectrum exists for modem 32 that allows both modems (36 and 42) to transfer data at their target rates. In such cases, the transmit spectrum may instead be set to allow one modem to transfer at its target data rate and the other modem to transfer at its highest possible rate under the circumstances.

Figure 5:
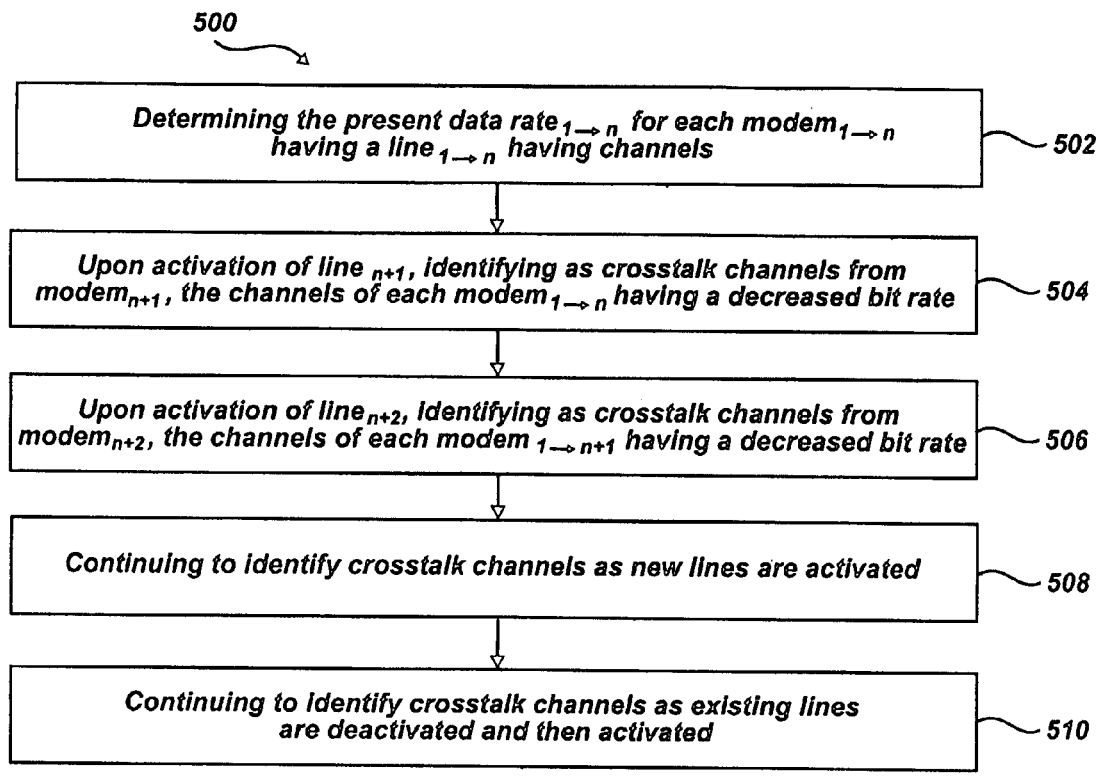
FIG. 5 is a flowchart for identifying crosstalk channels among lines in a binder by identifying bit-rate changes in existing channels that occur when a modem line first goes online.

As discussed above, a centralized technique for identifying a crosstalk line is based upon observing bit-rate changes in channels and/or bit-swapping between channels at the time a modem is activated. FIG. 5 shows steps for identifying crosstalk channels between modem lines. The steps may be performed as modems are activated and deactivated in the normal course of DSL subscriber usage. In this version, crosstalk channel information for the entire binder may be acquired over time.

At 502, received data rate information is obtained for each active modem. The received data rate information may include bit-rates per channel for each line. The received data rate information may be obtained by a receiver in the central office 20 in communication with each active modem. In one version, the received data rate information is obtained by a processor 44 at the central office and forwarded to each modem.

At 504, crosstalk channels are identified by observing changes in the lines of the binder as a modem is activated. The observed changes may include decreases in bit-rates in channels and/or bit-swapping between the channels of a line. The changes may be observed by a receiver in the central office 20, a processor 40, or other device. In one version, an existing channel experiencing the greatest decrease in bit-rate at the time a modem is activated is designated as the weakest channel, and the corresponding line is designated the weakest line with respect to the activated modem. The information obtained through identifying crosstalk channels may be stored by a device and may be forward to the modem. The information may identify the weakest channel and/or may include additional information, such as responses of other lines.

At 506, crosstalk channels are identified by observing changes in the lines of the binder as a second modem is activated. Information about the second modem may be added to the information about the previous modem.

At step 508, additional crosstalk channel information is obtained about channels in the binder as more modems are activated. At 510, crosstalk channel information is obtained about modems that had been active since before the first modem (step 504) was activated. This step recognizes that crosstalk channel information can be obtained only when a modem is first activated. In one version, this step depends on the users deactivating and reactivating their modems (typically in their normal course of usage). Over time, crosstalk channel information may be obtained for every line in the binder.

Figure 6:
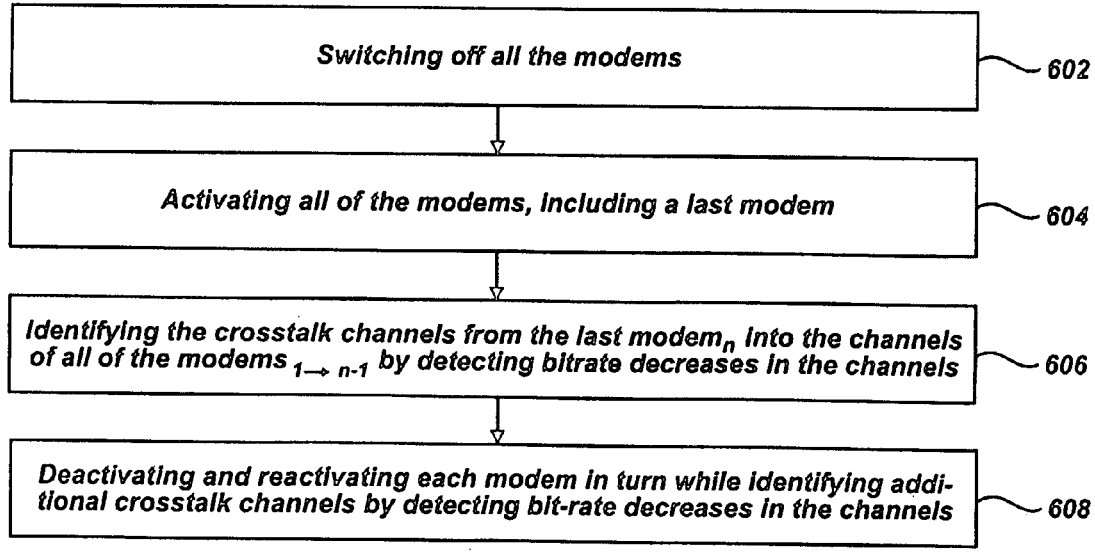
FIG. 6 is a flowchart for identifying crosstalk channels among lines in a binder using a successive activation technique.

FIG. 6 shows the steps 600 for identifying crosstalk channels between lines by first deactivating all of the modems and then obtaining crosstalk channel information by activating the modems in a controlled sequence. At step 602, all of the modems are deactivated. In one version, this step is implemented by the central office 20 at a predetermined time, such as at 3:00 a.m.

At step 604, all of the modems are activated, including a last activated modem. The crosstalk channels from the last activated modem are identified by observing data transfer rate changes in the lines of the binder such as decreases in bit-rates in channels and/or bit-swapping between the channels of a line. At 606, only one modem is deactivated and then reactivated, and the crosstalk channels from the reactivated modem are identified by observing data transfer rate changes in the lines of the binder. Step 606 is repeated for other modems. The information obtained through identifying crosstalk channels may be stored by a device and may be forwarded to the modem. The information may identify the weakest channel and/or may include additional information, such as responses of other lines.

Figure 7:
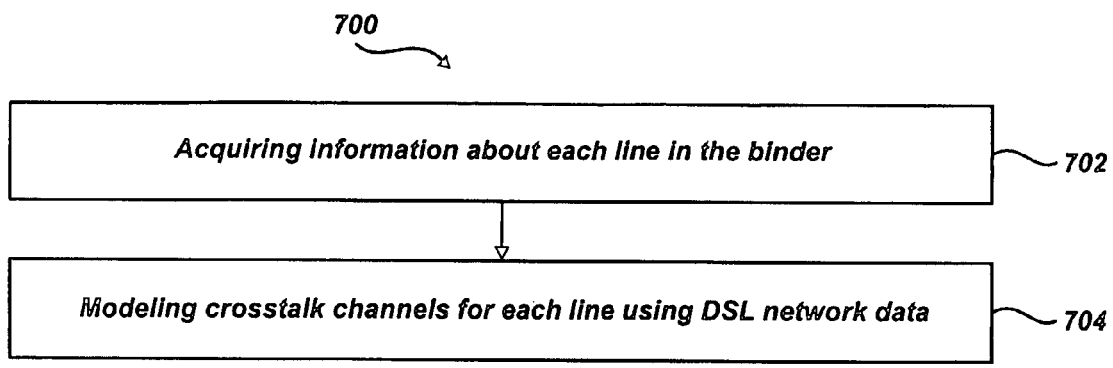
FIG. 7 is a flowchart for identifying crosstalk channels among lines in a binder using a modeling technique.

FIG. 7 shows the steps 700 for determining crosstalk channel information based upon DSL network data, including line lengths and gauges, the proximity of one line to another line, bit-rates, transmit spectrums, and the transmitted and received PSDs of the modem channels. Steps 702 and 704 include obtaining DSL network information and modeling crosstalk channels. The model may reflect that a modem line is extraordinarily long and/or serves a business paying for a high data transfer rate.

Figure 8:
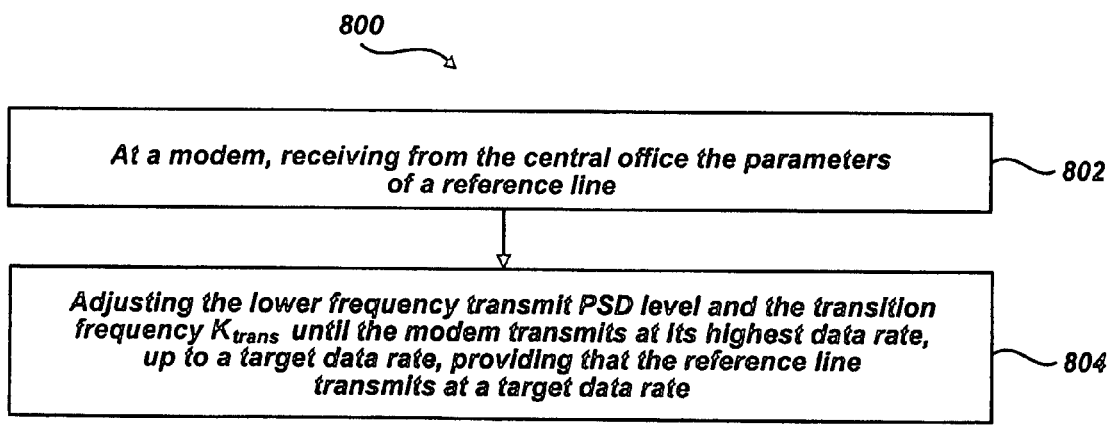
FIG. 8 is a flowchart for shaping a modem's transmit spectrum by adjusting a lower frequency transmit power spectral density and a transition frequency for a modem while considering the effects that the adjustments may have on a reference line.

FIG. 8 shows the steps for shaping a modem's transmit spectrum based upon information received from a device such as a processor 44. At 802, the modem receives the parameters of a reference line. The reference line may be an actual line, a modeled line, or a line defined by the processor 44. The parameters may include crosstalk channels and data transfer rates per channel. In one version, the modem sets an initial transmit PSD according to xDSL standards, and adjusts its transmit PSD so to achieve its own target rate and allow the reference line to achieve its target data transfer rate.

According to an implementation of the technique, a processor, for example in a central office, is configured to execute instructions received or obtained from a computer readable medium (not shown). The computer readable medium may have instructions for executing one or more of the steps of FIGS. 4-8. The computer readable medium may be a non-volatile memory device such as read-only memory (EPROM, flash memory, etc.) a hard disk, a floppy disk, magnetic tape, or other type of magnetic computer storage device. The computer readable medium may also be a memory device such as dynamic random access memory, static random access memory, content addressable memory, and dual-ported RAM. The processor 44 may be embedded in a device in the central office or may be provided as an add-on to the xDSL transmission system.

According to another implementation of the technique, a device at a location other than the central office, such as a modem, is configured to execute instructions received or obtained from a computer readable medium (not shown) or the processor 44. The computer readable medium may have instructions for executing one or more of the steps of FIGS. 4-8. The processor 44 may provide instructions to a modem for executing one or more of the steps of FIGS. 4-8. The computer readable medium may be a non-volatile memory device such as read-only memory (EPROM, flash memory, etc.) a hard disk, a floppy disk, magnetic tape, or other type of magnetic computer storage device. The computer readable medium may also be a memory device such as dynamic random access memory, static random access memory, content addressable memory, or dual-ported RAM.

The following formulas and algorithms can be used in conjunction with the techniques discussed above to obtain information about crosstalk interference from a line of a first modem into a line of a second active modem. Let modem "n" be online at a given time and have a background noise measurement of $\sigma_n(k)$ on channel "k". At some later time modem "m" activates with a PSD of $s_m(k)$, causing crosstalk to modem "n". The background noise of modem "n" increases to $\sigma_n'(k)$. The crosstalk channel gain, $s_{nm}(k)$, from modem "m" to modem "n" can then be estimated as $$s_{nm}(k) = \frac{\sigma_n'(k) - \sigma_n(k)}{s_m(k)}$$

For a signal "x" transmitted on line "n", the received signal "y" is:

$$y = x + \text{crosstalk} + \text{noise}(n);$$

which, for line "n" having "k" channels is:

$$y_k^n = h_k^{n,n} x_k^n + \sum_{m \neq n} h_k^{n,m} x_k^m + z_k^n$$

where h≡channel gain.

The total bit-rate on channel "k" of line "n" is:

$$b_k^n = \log_2\left(1 + \frac{|h_k^{n,n}|^2 s_k^n}{\sum_{m \neq n} |h_k^{n,m}|^2 s_k^m + \sigma_k^n}\right)$$

The total data rate on line "n" is:

$$R_n = \sum_k b_k^n$$

Crosstalk channel information from line n+1 into lines 1-to-n can be determined by rearranging $$b_k^i = \log_2\left(1 + \frac{1}{\Gamma} \frac{h_k^{i,i} g_k^{i,i} s_k^i}{h_k^{i,n+1} s_k^{n+1} + \sum_{j=i+1}^{n} h_k^{i,j} s_k^j + QLN_i(f_k)}\right)$$

where $$\Gamma \equiv SNR\text{-}gap, \text{ and}$$

$$QLN(f_k) = \sum_{i=1}^{n-1} h_k^{n,i} s_k^i + \sigma_k^n$$

is the quiet line noise consisting of crosstalk and background noise and g≡gain-scaling.

The following algorithm is for use with the centralized version of the technique for adjusting the transmit spectrum of a modem:

```
repeat
   for n = 1...N
      for psdlevel = -95,-94.5,...,mask(k)
         initialize s_n(k) = mask(k) ∀k
         k_trans = K+1
         repeat
            decrease transition tone k_trans = k_trans -1
            s_n(k) = psdlevel
```

$$\text{update } R_n = \sum_k \log_2\left(1 + \frac{h_n(k)s_n(k)}{\sum_{m \neq n} h_{nm}(k)s_m(k) + \sigma_n(k)}\right)$$

```
         until R_n > R_n^target
         k_opt(psdlevel) = k_trans
``` update $R_r$(psdlevel) =

$$\sum_k \log_2\left(1 + \frac{h_r(k)s_r(k)}{\sum_{m \neq r} h_{rm}(k)s_m(k) + \sigma_r(k)}\right)$$

```
      end for
      psdlevel_opt = arg max_{psdlevel} R_r(psdlevel)
      s_n(k) = mask(k), ∀ k<k_opt(psdlevel_opt)
      s_n(k) = psdlevel_opt, ∀ k≥k_opt(psdlevel_opt)
   end
until convergence.
``` where
r = index of longest line in binder
N = number of lines in binder
K = number of channels in system
hn(k) = direct channel gain of modem n on channel k
hnm(k) = crosstalk channel gain from transmitter of modem m into receiver of line n
σn(k) = noise PSD of modem n on channel k
sn(k) = transmit PSD of modem n on channel k
mask( ) = transmit mask on channel k
Rn = data-rate of line n The following algorithm is for use with the autonomous version of the technique for adjusting the transmit spectrum of a modem:

$$k_{trans} = K$$

$$s_k^n = s_k^{refpsd}, k = 1 \ldots K$$

$$\text{while}\left(\sum_k b_k^n > R_n^{target}\right) \Big| \left(\sum_k s_k^n > p_n\right)\{$$

$$s_k^n = s_k^n - \delta, k = 1 \ldots K$$

$$\text{update } b_k^n, k = 1 \ldots K$$

}

$$\text{while}\left(\sum_k b_k^n < R_n^{target}\right) \& \left(\sum_k s_k^n > p_n\right)\{$$

$$s_{k_{trans}}^n = s_{k_{trans}}^{mask}$$

$$\text{update } b_{k_{trans}}^n$$

$$k_{trans} --$$

}

Figure 9A:
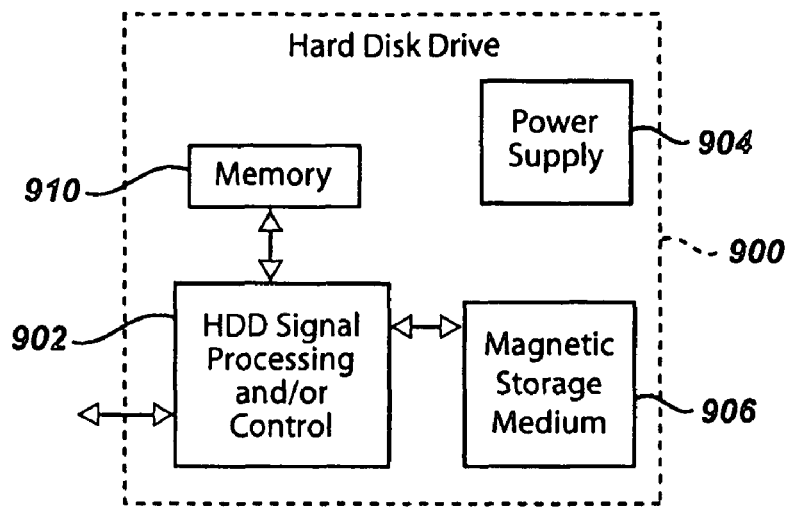
FIG. 9A is a functional block diagram of a hard disk drive.

Referring now to FIGS. 9A-9E, various exemplary implementations of the present invention are shown. Referring now to FIG. 9A, the disclosed technique for determining a transmit spectrum can be implemented in a hard disk drive (HDD) 900 having a modem. The present invention may be implemented in a signal processing circuit, which is generally identified in FIG. 9A at 902. In some implementations, the signal processing circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links. The HDD 900 may be connected to memory 910 such as random access memory (RAM), low latency nonvolatile memory such as flash memory, read only memory (ROM) and/or other suitable electronic data storage.

Figure 9B:
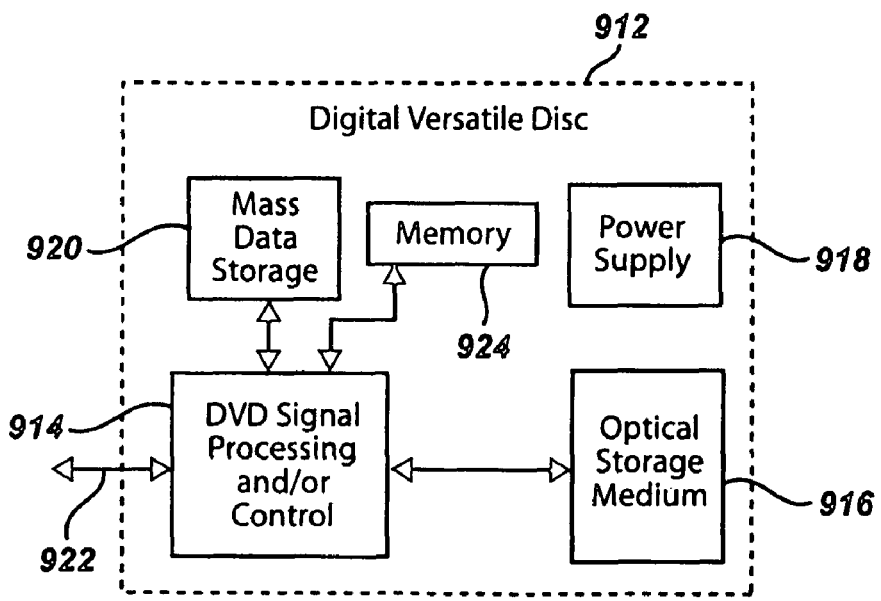
FIG. 9B is a functional block diagram of a digital versatile disk (DVD).

Referring now to FIG. 9B, the disclosed technique for determining a transmit spectrum can be implemented in a digital versatile disc (DVD) drive 912 having a modem. The present invention may be implemented in a signal processing circuit, which is generally identified in FIG. 9B at 914. The signal processing circuit 914 and/or other circuits (not shown) in the DVD 912 may process data, perform coding and/or encryption, perform calculations, and/or format data that is read from and/or data written to an optical storage medium 916. In some implementations, the signal processing circuit 914 and/or other circuits (not shown) in the DVD 912 can also perform other functions such as encoding and/or decoding and/or any other signal processing functions associated with a DVD drive.

The DVD drive 912 may communicate with an output device (not shown) such as a computer, television or other device via one or more wired or wireless communication links 922. The DVD 912 may communicate with mass data storage 920 that stores data in a nonvolatile manner. The mass data storage 920 may include a hard disk drive (HDD). The HDD may have the configuration shown in FIG. 9A. The HDD may be a mini HDD that includes one or more platters having a diameter that is smaller than approximately 1.8". The DVD 912 may be connected to memory 924 such as RAM, ROM, low latency nonvolatile memory such as flash memory and/or other suitable electronic data storage.

Figure 9C:
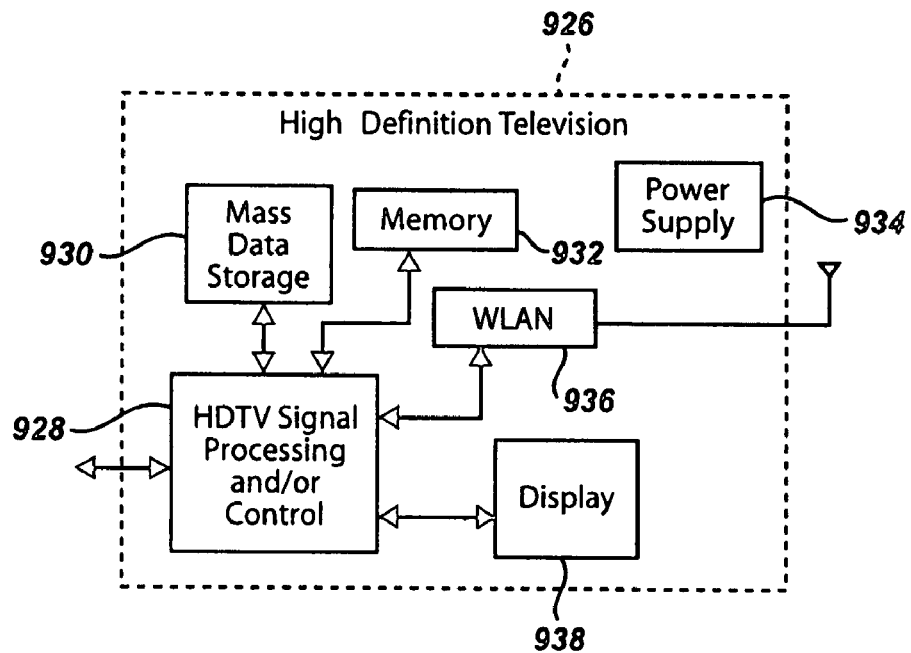
FIG. 9C is a functional block diagram of a high definition television.

Referring now to FIG. 9C, the disclosed technique for determining a transmit spectrum can be implemented in a high definition television (HDTV) 926 having a modem. The present invention be implemented in a signal processing circuit, which is generally identified in FIG. 9C at 928. The HDTV 926 receives HDTV input signals in either a wired or wireless format and generates HDTV output signals for a display 938. In some implementations, the signal processing circuit 928 and/or other circuits (not shown) of the HDTV 926 may process data, perform coding and/or encryption, perform calculations, format data and/or perform any other type of HDTV processing that may be required.

The HDTV 926 may communicate with mass data storage 930 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 926 may be connected to memory 932 such as RAM, ROM, low latency nonvolatile memory such as flash memory and/or other suitable electronic data storage. The HDTV 926 also may support connections with a WLAN via a WLAN network interface 936.

Figure 9D:
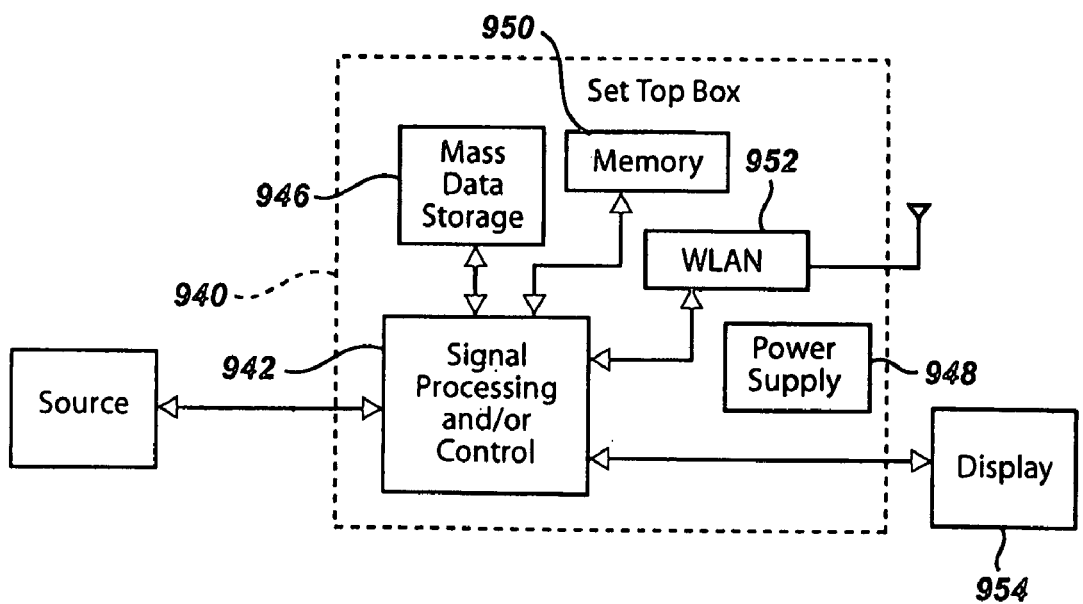
FIG. 9D is a functional block diagram of a set top box.

Referring now to FIG. 9D, the disclosed technique for determining a transmit spectrum can be implemented in a set top box 940 having a modem. The present invention may be implemented in a signal processing circuit, which is generally identified in FIG. 9D at 942. The set top box 940 receives signals from a source such as a broadband source and outputs standard and/or high definition audio/video signals suitable for a display 954 such as a television and/or monitor and/or other video and/or audio output devices. The signal processing and/or control circuits 942 and/or other circuits (not shown) of the set top box 940 may process data, perform coding and/or encryption, perform calculations, format data and/or perform any other set top box function.

The set top box 940 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 940 may be connected to memory 950 such as RAM, ROM, low latency nonvolatile memory such as flash memory and/or other suitable electronic data storage. The set top box 940 also may support connections with a WLAN via a WLAN network interface 952.

Figure 9E:
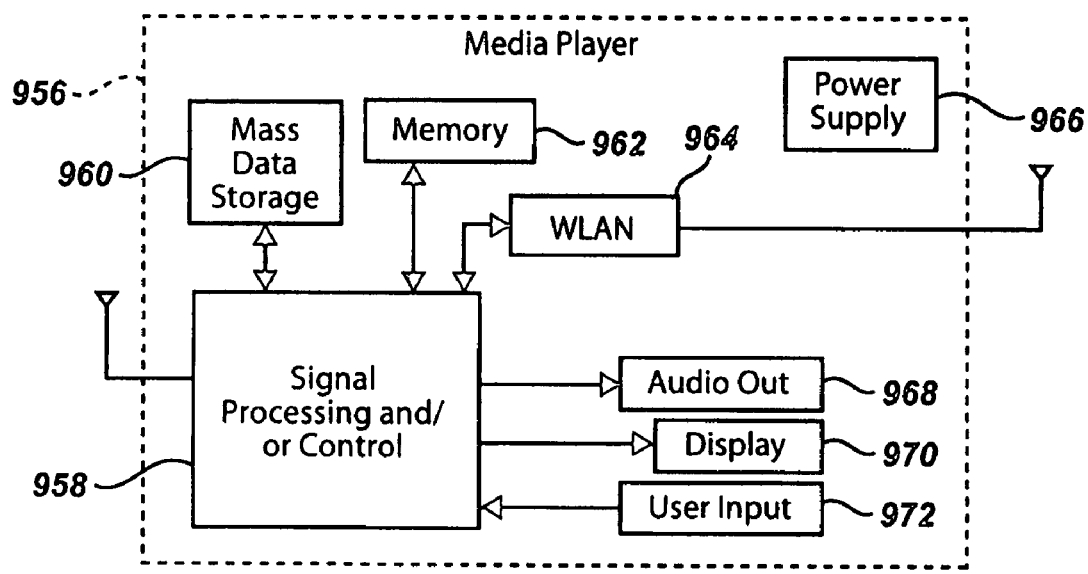
FIG. 9E is a functional block diagram of a media player.

Referring now to FIG. 9E, the disclosed technique for determining a transmit PSD can be implemented in a media player 956 having a modem. The present invention may be implemented in a signal processing circuit, which is generally identified in FIG. 9E at 958. In some implementations, the media player 956 includes a display 970 and/or a user input 972 such as a keypad, touchpad and the like. In some implementations, the media player 956 may employ a graphical user interface (GUI) that typically employs menus, drop down menus, icons and/or a point-and-click interface via the display 970 and/or user input 972. The media player 956 further includes an audio output 968 such as a speaker and/or audio output jack. The signal processing circuit 958 and/or other circuits (not shown) of the media player 956 may process data, perform coding and/or encryption, perform calculations, format data and/or perform any other media player function.

The media player 956 may communicate with mass data storage 960 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 956 may be connected to memory 962 such as RAM, ROM, low latency nonvolatile memory such as flash memory and/or other suitable electronic data storage. The media player 956 also may support connections with a WLAN via a WLAN network interface 964. Still other implementations in addition to those described above are contemplated.

It is intended that the foregoing detailed description be regarded as illustrative rather than limiting, and that it be understood that it is the following claims, including all equivalents, that are intended to define the spirit and scope of this invention.

The invention claimed is:

1. A method for shaping a transmit spectrum for a first modem connected to a first line in a digital subscriber line network binder, comprising:
    selecting a second line, connected to a second modem, as a crosstalk line;
    transmitting a signal from the first modem within a first transmit spectrum having a first transition frequency and a first low frequency power spectral density; and
    monitoring change in a data rate of the second modem while adjusting the first transition frequency and the first low frequency power spectral density.

2. The method of claim 1 further comprising shaping the first transmit spectrum based upon change in the data rate of the second modem.

3. The method of claim 1 further comprising monitoring change in a data rate of the first modem while adjusting the first transition frequency and the first low frequency power spectral density.

4. The method of claim 3 further comprising shaping the transmit spectrum based upon change in the data rate of the second modem and change in the data rate of the first modem.

5. The method of claim 4 wherein the step of shaping the transmit spectrum is further based upon a target data rate for the second modem.

6. The method of claim 4 wherein the step of shaping the transmit spectrum is further based upon a target data rate for the first modem.

7. The method of claim 6 wherein the step of shaping the transmit spectrum is further based upon a target data rate for the second modem.

8. The method of claim 1 further comprising communicating a change in the data rate of the second modem.

9. The method of claim 1 further comprising receiving from a processor in a central office information about a change in the data rate of the second modem.

10. The method of claim 1 wherein the second line is selected from a group of lines consisting of: weak, long, neighboring, low bit-rate, low data-rate, basic service, and premium service.

11. The method of claim 1 further comprising adjusting the first low frequency power spectral density by decrements of approximately 0.1 dB from an initial first low frequency power spectral density of approximately 0.0 dBm/Hz.

12. The method of claim 11 further comprising adjusting the first transition frequency by single channel decrements from an initial first transition frequency channel of approximately 30 MHz.

13. The method of claim 1 further comprising:
    a) initiating the first transition frequency to approximately 30 MHz;
    b) initiating the first low frequency power spectral density to approximately 0 dBm/Hz;
    c) adjusting the first low frequency power spectral density by decrements of approximately 0.1 dB, to approximately −90 dBm/Hz, and monitoring change in the data rate of the second modem for each decrement; and
    d) adjusting the first transition frequency by a single channel decrement.

14. The method of claim 13 further comprising repeating steps (a)-(d) until the first transition frequency is approximately equal to a lowest frequency in a spectral mask for the first modem.

15. The method of claim 1, further comprising:
    deactivating the first modem;
    activating a plurality of user modems connected to a plurality of lines in the binder;

and monitoring, upon reactivation of the first modem, a data rate change for each of the plurality of user modems.

16. The method of claim 15 further comprising selecting as the crosstalk line a line connected to a user modem, in the plurality of user modems, having a most significant decrease in data rate.

17. The method of claim 16, further comprising communicating an identification of the crosstalk line.

18. The method of claim 15 wherein monitoring the data rate for each of the plurality of user modems comprises monitoring a bit-rate for each channel in each of the plurality of user modems.

19. The method of claim 18, further comprising communicating an identification of a channel having a greatest decrease in bit rate.

20. The method of claim 15, further comprising identifying crosstalk channels as each of the plurality of user modems are deactivated and reactivated.

21. The method of claim 1, further comprising:
activating a plurality of modem lines;
deactivating the first line;
monitoring a first data rate of each of the plurality of modem lines;
activating the first line;
monitoring a second data rate of each of the plurality of modem lines;
determining for each modem line a change in data rate based upon the first data rate and the second data rate; and
selecting the crosstalk line as the line having the most significant decrease in data rate.

22. The method of claim 21 wherein the first and second data rates are first and second bit rates, respectively.

23. The method of claim 1 further comprising:
acquiring information about a plurality of lines in the binder;
modeling crosstalk channels for the plurality of lines, respectively, based upon the information; and
selecting the crosstalk line based upon the modeled crosstalk channels.

24. The method of claim 23 wherein the information is selected from a group of DSL network data consisting of: a length of at least one line in the binder, a gauge of at least one line in the binder, a location of at least one line in the binder, a bit rate of at least one channel in the binder, a transmit spectrum of at least one signal in the binder, and a power spectral density of at least one channel in the binder.

25. The method of claim 1 further comprising communicating to the first modem information for defining the crosstalk line.

26. The method of claim 1 further comprising receiving a signal to identify the crosstalk line.

27. An apparatus, comprising:
a first modem connected to a first line in a digital subscriber line network binder; and
a processor configured to:
select a second line, connected to a second modem, as a crosstalk line,
transmit a signal from the first modem within a first transmit spectrum having a first transition frequency and a first low frequency power spectral density, and
monitor change in a data rate of the second modem while adjusting the first transition frequency and the first low frequency power spectral density.

28. The apparatus of claim 27 wherein the processor is configured to shape the first transmit spectrum based upon change in the data rate of the second modem.

29. The apparatus of claim 27 wherein the processor is configured to monitor change in a data rate of the first modem while adjusting the first transition frequency and the first low frequency power spectral density.

30. The apparatus of claim 29 wherein the processor is configured to shape the transmit spectrum based upon change in the data rate of the second modem and change in the data rate of the first modem.

31. The apparatus of claim 30 wherein the processor is configured to shape the transmit spectrum based upon a target data rate for the second modem.

32. The apparatus of claim 30 wherein the processor is configured to shape the transmit spectrum based upon a target data rate for the first modem.

33. The apparatus of claim 32 wherein the processor is configured to further shape the transmit spectrum based upon a target data rate for the second modem.

34. The apparatus of claim 27 wherein the processor is configured to communicate information about a change in the data rate of the second modem.

35. The apparatus of claim 27 wherein the processor is configured to receive a signal indicating change in the data rate of the second modem.

36. The apparatus of claim 27 wherein the second line is selected from a group of lines consisting of weak, long, neighboring, low bit-rate, low data-rate, basic service, and premium service.

37. The apparatus of claim 27 wherein the processor is configured to adjust the first low frequency power spectral density by decrements of approximately 0.1 dB from an initial first low frequency power spectral density of approximately 0.0 dBm/Hz.

38. The apparatus of claim 37 wherein the processor is configured to adjust the first transition frequency by single channel decrements from an initial first transition frequency channel of approximately 30 MHz.

39. The apparatus of claim 27 wherein the processor is configured to:
a) initiate the first transition frequency to approximately 30 MHz, b) initiate the first low frequency power spectral density to approximately 0 dBm/Hz, c) adjust the first low frequency power spectral density by decrements of approximately 0.1 dB, to approximately −90 dBm/Hz, and monitor change in the data rate of the second modem for each decrement, and d) adjust the first transition frequency by a single channel decrement.

40. The apparatus of claim 39 wherein the processor is configured to repeat (a)-(d) until the first transition frequency is approximately equal to a lowest frequency in a spectral mask for the first modem.

41. The apparatus of claim 27, wherein the processor is configured to monitor change in a data rate of each of a plurality of user modems in the digital subscriber line network upon activation of the first modem.

42. The apparatus of claim 41 wherein the processor is configured to select as the crosstalk line a line connected to a user modem, in the plurality of user modems, having a most significant decrease in data rate.

43. The apparatus of claim 41 wherein the processor is configured to monitor a change in bit rate of a plurality of channels in the binder.

44. The apparatus of claim 42, wherein the processor is configured to communicate an identification of the crosstalk line.

45. The apparatus of claim 43, wherein the processor is configured to communicate an identification of a channel having a most significant decrease in bit-rate.

46. The apparatus of claim 41, wherein the processor is configured to identify crosstalk channels as each of the plurality of user modems are deactivated and reactivated.

47. The apparatus of claim 27, wherein the binder has a plurality of modem lines, including the first line, and wherein the processor is configured to activate all of the modem lines, deactivate the first line, monitor a first data rate of each of the plurality of modem lines, activate the first line, monitor a second data rate of each of the plurality of modem lines, determine for each line a change in data rate based upon the first data rate and the second data rate, and select the crosstalk line as the line having a most significant decrease in data rate.

48. The apparatus of claim 47 wherein the first and second data rates are based upon bit rate change per channel of each line in the plurality of modem lines.

49. The apparatus of claim 27 wherein the processor is configured to acquire information about a plurality of lines in the binder, model crosstalk channels for the plurality of lines based upon the information, and select the crosstalk line based upon the modeled crosstalk channels.

50. The apparatus of claim 49 wherein the information is selected from network data consisting of: a length of at least one line in the binder, a gauge of at least one line in the binder, a location of at least one line in the binder, a bit-rate of at least one channel in the binder, a transmit spectrum of at least one signal in the binder, and a power spectral density of at least one channel in the binder.

51. The apparatus of claim 27 wherein the processor is configured to receive from a second processor information for defining the crosstalk line.

52. The apparatus of claim 27 wherein the processor is configured to receive the identification of the crosstalk line.

53. A method for shaping a transmit spectrum for a first modem connected to a first line in a digital subscriber line network binder, comprising:
selecting a second line, connected to a second modem, as a crosstalk line;
receiving first data rate information from the second modem while the first modem transmits at a first transition frequency and a first low frequency power spectral density;
receiving second data rate information from the second modem while the first modem transmits at a second transition frequency, different from the first transition frequency, and a second low frequency power spectral density, different from the first low frequency power spectral density; and
shaping the transmit spectrum based upon the first data rate information and the second data rate information.

54. The method of claim 53 further comprising defining a parameter of the transmit spectrum and communicating the parameter to a central office.

55. The method of claim 53 further comprising defining a parameter of the transmit spectrum and communicating the parameter to the first modem.

56. The method of claim 53 further comprising shaping the transmit spectrum based upon the first data rate information, the second data rate information, a first modem target data rate, and a second modem target data rate.

57. The method of claim 53, further comprising selecting the second line from a plurality of network lines based upon first network line data rate information obtained while the first modem is deactivated and second network line data rate information obtained while the first modem is activated.

58. The method of claim 53 further comprising selecting the second line based upon at least one line parameter selected from a group of line parameters including: strength, length, location, bit-rate, data rate, and service level supported.

59. The method of claim 53 further comprising defining the crosstalk line based upon data received from a central office.

60. An apparatus for use with a modem line in a digital subscriber line network binder, comprising:
a first device to connect to the modem line; and
a processor configured to:
select a crosstalk line within the digital subscriber line network binder,
receive first data rate information from the crosstalk line while the modem line transmits at a first transition frequency and a first low frequency power spectral density,
receive second data rate information from the crosstalk line while the modem line transmits at a second transition frequency, different from the first transition frequency, and a second low frequency power spectral density, different from the first low frequency power spectral density, and
shape a transmit spectrum based upon the first data rate information and the second data rate information.

61. The apparatus of claim 60 wherein the first device is a processor in a central office.

62. The apparatus of claim 60 wherein the first device is a modem having a processor.

63. The apparatus of claim 60 wherein the processor is configured to define a parameter of the transmit spectrum and communicate the parameter to a central office.

64. The apparatus of claim 60 wherein the processor is configured to define a parameter of the transmit spectrum and communicate the parameter to a modem.

65. The apparatus of claim 60 wherein the processor is configured to shape the transmit spectrum based upon the first data rate information, the second data rate information, a first modem target data rate, and a crosstalk line target data rate.

66. The apparatus of claim 60 wherein the processor is configured to select the crosstalk line from a plurality of network lines based upon first network line data rate information obtained while the modem line is deactivated and second network line data rate information obtained while the modem line is activated.

67. The apparatus of claim 60 wherein the processor is configured to select the crosstalk line based upon a line characteristic selected from a group of line characteristics consisting of: weak, long, neighboring, low bit-rate, low data-rate, basic service, and premium service.

68. The apparatus of claim 60 wherein the processor is configured to select the crosstalk line based upon data received from a central office.

69. A method for shaping a transmit spectrum for a first modem having a first line in a digital subscriber line network binder, comprising:
selecting a second line, connected to a second modem, in the digital subscriber line network binder as a crosstalk line;
providing first data to a device, the first data indicating a first rate of data within the crosstalk line while the first modem transmits at a first transition frequency and a first low frequency power spectral density;
providing second data to the device, the second data indicating a second rate of data within the crosstalk line while the first modem transmits at a second transition frequency, different from the first transition frequency, and at a second low frequency power spectral density, different from the first low frequency power spectral density; and shaping a transmit spectrum based upon the first rate of data and the second rate of data.

70. The method of claim 69 wherein the device is a processor in a central office.

71. The method of claim 69 wherein the device is the first modem.

72. The method of claim 69 wherein the first rate of data is a first bit rate in a channel in the crosstalk line, and the second rate of data is a second bit rate in the channel in the crosstalk line.

* * * * *